Feb. 13, 1923.　　　　　　　　　　　　　　　　　　1,444,807
F. S. STAFFORD
WHEEL
Filed Dec. 5, 1919
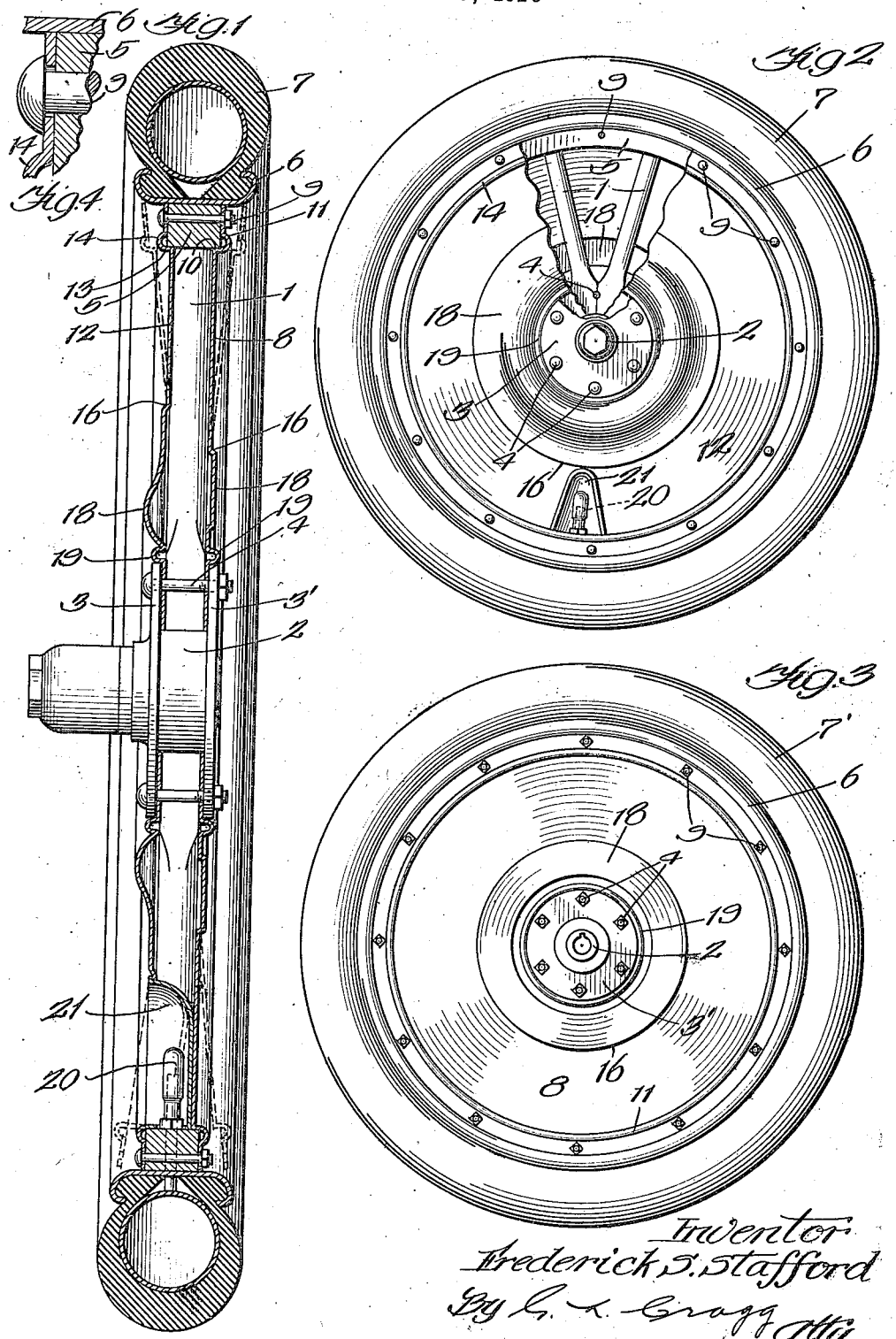
Inventor
Frederick S. Stafford
By G. L. Cragg, Atty Patented Feb. 13, 1923.

1,444,807

UNITED STATES PATENT OFFICE.

FREDERICK S. STAFFORD, OF CHICAGO, ILLINOIS, ASSIGNOR TO HENRY G. SAAL, OF CHICAGO, ILLINOIS.

WHEEL.

Application filed December 5, 1919. Serial No. 342,643.

*To all whom it may concern:*

Be it known that I, FREDERICK S. STAFFORD, citizen of the United States, residing at Chicago, in the county of Cook and State of Illinois, have invented a certain new and useful Improvement in Wheels, of which the following is a full, clear, concise, and exact description.

My invention relates to wheels and is of particular service in the formation of vehicle wheels employed in the manufacture and reconstruction of motor vehicles though the invention is not to be limited in its use.

In carrying out certain characteristics of my invention I employ a metal disc formed with a peripheral shoulder upon its inner face, this shoulder being surrounded and engaged by the wheel rim or the felly portion of such rim if the wheel happens to carry a pneumatic or other tire. This shoulder is preferably formed by providing the disc with an outwardly bulging circular bead extending further inward upon its inner circle to form the shoulder and being surrounded by and joining with a circumscribing ring portion of the disc which is secured to the wheel felly by bolts. In the form of the invention herein disclosed, the disc is provided with a circular opening at its central portion, this opening being sufficiently large to receive a hub portion of the wheel with which the disc is in engagement.

A wheel embodying the preferred form of my invention employs spokes, preferably of wood, which radiate from a hub at their inner ends and are attached at their outer ends to a wheel rim or felly, and two discs between which the spokes are disposed. Before the application of the discs to the wheel they are sufficiently dished to be engageable with the wheel spokes along circular lines well within the rim or felly of the wheel and to flare away from the wheel from the places of contact of the discs with the wheel spokes. Bolts are employed to clamp the central and the felly portions of the discs and the wheel together. In this clamping operation the resiliency of the discs is overcome to bring the discs in close engagement with the wheel spokes and to engage the shoulders at the peripheries of the discs with the felly of the wheel. A wheel thus constructed is free of noisy vibration of the discs and is well adapted to previously constructed wooden wheels which are thereby strengthened or restored in strength to make them of further service if about worn out and improving them in appearance.

In accordance with one of the characteristics of my present invention, the bases of the spokes of the wheel are clamped between a hub flange and a clamping plate and the discs are clamped one preferably between the spokes and hub flange and the other also preferably between the spokes and the clamping plate. The same bolts which are employed to clamp the spokes between said hub flange and plate may pass through the discs to clamp them in position.

I will explain my invention more fully by reference to the accompanying drawing in which Fig. 1 is a diametrical sectional view of a wheel embracing my invention; Fig. 2 is an outer face view of the wheel shown in Fig. 1 with parts broken away; Fig. 3 is an inner face view of the wheel; and Fig. 4 is an enlargement of part of Fig. 1.

Like parts are indicated by similar characters of reference throughout the different figures.

I have illustrated a common form of wooden spoked non-propelling automobile vehicle wheel to which my invention is applied. The wheel shown includes wooden spokes 1 having widened bases that bring adjacent ones of them in contact with each other where they immediately surround the hub 2 that is formed preferably of metal. The hub has a circular flange 3 between which and a circular clamping plate 3′ the bases of the spokes are clamped by means of bolts 4. The spokes are joined, at their outer ends, with a felly 5 constituting a tire support for the wheel rim. A tire retaining rim 6 surrounds and is secured to the felly when the wheel is pneumatic. A pneumatic tire 7 is held by said tire supporting rim.

A metal disc 8 is disposed upon the inner face of the wheel, this disc being secured in place by means of bolts 9 that pass through the felly portion 5 and clamp the peripheral portion of said disc against the inner face of said felly portion. The wheel felly portion 5 has its inner circular face supported and seated upon or in snug engagement with an annular shoulder 10 which is preferably formed upon the disc 8 by producing thereon an outwardly bulging bead 11 which is concentric with the periphery of the wheel and said disc. The inner circular side of said bead is wider than its outer circular side so that the circumscribing ring like of peripheral portion of the disc that is clamped to the felly portion 5 will be in a plane that is outwardly beyond the general plane of the disc portion supporting the shoulder 10 so that the formation of a shoulder adapted to the support of the felly portion 5 illustrated is assured. The invention, however, is not to be limited to this construction for producing the shoulder which would not be required with all shapes of the felly portion 5.

Another metal disc 12 is disposed upon the wheel, this second disc being upon the outer face of the wheel, the same bolts 9 that clamp disc 8 to the periphery of the wheel felly portion 5 also performing this function upon disc 12, these bolts clamping the peripheral portion of disc 12 against the outer face of said felly portion. The wheel felly portion 5 has its inner circular face also supported and seated upon or in snug engagement with a shoulder 13 which is preferably formed upon the disc 12 by producing thereon an outwardly bulging bead 14 which is concentric with the periphery of the wheel and said discs. The inner circular side of said bead 14 is wider than its outer circular side so that the circumscribing ring like or peripheral portion of the disc 12 that is clamped to the felly portion 5 will, as in the case of disc 8, be in a plane that is outwardly beyond the general plane of the disc portion supporting the shoulder 13 so that the formation of a shoulder adapted to the support of the felly portion 5 illustrated is assured. As hitherto stated, the invention is not to be limited to this construction for producing the shoulder.

The holes in the discs 8 and 12 that receive the bolts 9 are elongated or enlarged radially of the wheel, preferably upon opposite sides of the bolts, to permit of slight movements of the discs in the plane of and with reference to the wheel. This construction avoids such rigid interrelation between the discs and the wheel structure or wheel elements interposed therebetween as would prevent slight yielding of the felly portion of the wheel with respect to the hub portion. This construction also permits the discs to yield resiliently between their peripheral portions and their central portions, particularly if the latter portions are so secured to or so engage the hub portions of the wheel as to be substantially immovable with respect thereto.

Each of the discs 8 and 12 is formed preferably of spring steel about one sixteenth of an inch in thickness. Before the application of each of the discs 8 and 12 to the wheel it is preferably generally concave or of dish form, as illustrated by dotted lines, being constrained against its own resilience to its flatter form by means of the bolts 9. The rim of the bottom of each initially dished disc is formed by means of a shoulder forming bead 16 which is concentric with the wheel and its discs, each shoulder extending inwardly beyond the portion of the disc it circumscribes to constitute the shoulder a fulcruming edge, engaging the wheel spokes 1, upon which such disc is brought from its outwardly flaring form illustrated by dotted lines to its flatter form by the action of the clamping bolts 9, the circumscribed or central disc portions being clamped to the hub of the wheel by the bolts 4 passing through and between the bases of the spokes, these being the aforesaid bolts that also clamp the spokes between the circular hub flange 3 and the circular clamping plate 3'. As illustrated, the central portion of disc 8 is between the clamping plate 3' and the spokes 1, while the central portion of disc 12 is between the hub flange 3 and the spokes. By this construction the discs 8 and 12 are pressed against the wheel spokes in a manner to prevent rattling and to reinforce and strengthen the wooden portion of the wheel, the discs of my invention being applicable to worn wooden wheels as well as being of service in the formation of new wheels.

A large outwardly bulging annular swell 18, concentric with the wheel and its discs, is formed in each disc 8 and 12 near the clamping parts 3 and 3', this swell contributing to the ornate appearance of the discs and imparting a small degree of flexibility to the discs that readily permits the discs to be changed from their dish formation to their flatter formation when they are clamped in place at their central and peripheral portions. This swelling formation 18 in each disc also adds a spring or resilient quality to each disc having it and urges the annular shoulder 16 of such disc against the spokes 1 of the wheel and maintains the shoulder and these spokes in engagement during and after the flattening of such disc by the bolts 9. The discs 8 and 12 have each a central circular opening that receives the hub 2. This central opening in each disc is surrounded by an outwardly projecting annular bead or shoulder 19 spaced sufficiently apart therefrom to be in snug engagement with the periphery of the circular hub flange 3. The edge or shoulder 19 also forms a centering device in the assembly of each disc with the wheel.

The outer disc 12 is provided with a recessed formation at which there is accessibly disposed the usual nipple 20 employed for connection with a source of air under pressure and having connection with the inner tube of the tire whereby the tire may be inflated or replenished with air under pressure. A pocket formation 21, opening outwardly, is preferably provided to receive said nipple. The pocket formation may be a separate piece of shaped sheet metal interlocked at its forward edge with the portion of the disc (12) margining the recess formed therein. The nipple and the pocketed formation receiving it are between adjacent wheel spokes (where spokes are employed) being just as accessible for manipulation as though the discs were absent.

While I have herein shown and particularly described the preferred embodiment of my invention I do not wish to be limited to the precise details of construction shown as changes may readily be made without departing from the spirit of my invention, but having thus described my invention I claim as new and desire to secure by Letters Patent the following:—

A wheel having a tire, spokes, and a hub which has a flange and a circular clamping plate between which hub elements the inner ends of the spokes are disposed; in combination with a disc substantially covering a face portion of the wheel that is surrounded by the tire and secured against the wheel and formed of resilient metal of dish form flaring away from the wheel when its resiliency is unconstrained and then engageable with the wheel spokes at its unflaring portion and constrained to flatter form when secured to the wheel; and an annular portion clamped against one of the aforesaid hub elements by the aforesaid clamping plate.

In witness whereof, I hereunto subscribe my name this eighteenth day of November A. D., 1919.

FREDERICK S. STAFFORD.